United States Patent Office 3,197,291
Patented July 27, 1965

3,197,291
CERAMIC COATED CORROSION-RESISTANT
PRODUCT
Harold J. Michael, Columbus, Ohio, assignor to
North American Aviation, Inc.
No Drawing. Original application Apr. 17, 1961, Ser.
No. 103,243. Divided and this application July 19,
1962, Ser. No. 211,105
1 Claim. (Cl. 29—195)

This invention relates generally to high-temperature ceramic protective coatings, and particularly concerns a product having material which readily oxidizes or corrodes when exposed to oxidizing or corroding environments at elevated temperatures and having a ceramic coating provided thereon which develops improved resistance against such oxidation or corrosion especially at temperatures from approximately 1700° F. to approximately 2150° F.

Also, this application is a divisional application of application Serial No. 103,243, filed April 17, 1961.

As used in this application, the term "high-temperature ceramic protective coating" refers to a protective coating which is essentially comprised of glass frit and refractory constituents and which has an oxidation or corrosion protection service temperature upper limit in the range of from approximately 1700° F. to approximately 2150° F. In the practice of my invention, such high-temperature ceramic protective coatings are applied to the to-be-protected parts in slip form and are fired to maturity in an air atmosphere at a temperature which is at least as high as approximately 1700° F.

Much difficulty has been experienced in adequately protecting oxidizable or corrosion-susceptible metallic surfaces against deterioration when such surfaces are to be subjected to an oxidizing or chemically corroding environment at an elevated exposure temperature. Particular difficulty has been experienced in providing such metallic surfaces with a ceramic coating that is effective to protect against oxidation, corrosion, and the like at exposure temperatures which extend into the range of from approximately 1700° F. upwards. The basic problems appear to involve both selection of a ceramic coating which affords adequate protection for all underlying materials at the elevated temperatures and developing proper adhesion of the ceramic coating to the oxidizable or corrosion-susceptible metallic surface.

This invention utilizes process steps wherein a part having an oxidizable or corrosion-susceptible metallic surface is first provided with an adhering overlay comprised of nickel and chromium and afterwards provided with a high-temperature ceramic protective coating in adhering or fused relation to the nickel-chromium overlay. In the preferred practice of this invention the nickel and chromium overlay is developed by the sequential application of nickel and chromium strikes prior to application of the suitable ceramic material to the processed part. As will be described in the specification, however, any of several techniques may be employed to develop the necessary nickel-chromium overlay.

An important object of this invention is to provide an improved process for applying a high-temperature ceramic protective coating to an oxidizable or corrosion-susceptible surface of a part to thereby develop increased service life for the part when employed in oxidation or corrosion-causing environments at temperatures in a temperature range extending from approximately 1700° F. to an upper limit of approximately 2150° F.

Another object of this invention is to provide a process which may be advantageously practiced in connection with the application of high-temperature ceramic protective materials to metal surfaces of a base product to obtain improved adhesion of such protective materials entirely throughout a service temperature range which extends from as low as approximately −100° F. to as high as approximately 2150° F.

Another object of this invention is to provide a product which has oxidation or corrosion-susceptible surface material with high-temperature ceramic protective coating that is characterized by a complete absence of porosity throughout operating temperature ranges which extend, at their upper limit, to approximately 2150° F. and that develops improved protection for all materials beneath the ceramic coating when subjected to oxidizing atmospheres and the like at such elevated operating temperatures.

A still further object of this invention is to provide a novel process for applying high-temperature ceramic protective materials to corrosion-susceptible metal surfaces of a base product whereby the resulting product is characterized by an improved ability to withstand thermal shock resulting from comparatively rapid thermal cycling throughout a range between the temperature limits of approximately −100° F. and 2150° F., without loss of corrosion protection.

A still further object of my invention is to provide an improved high-temperature ceramic coating for protecting metal surfaces and which is characterized by improved devitrification properties.

Another object of this invention is to provide a ceramic-coated product having improved resistance to chemical attack at operating temperatures in the range of from approximately 1700° F. to approximately 2150° F.

Another object of my invention is to provide a process for applying high-temperature ceramic protective coatings to oxidizable metal surfaces and which develops an improved wetting action during coating firing operations in air atmospheres at temperatures of approximately 1700° F. and above.

Another object of this invention is to provide a process method and resulting product which permits the substitution of non-premium steel and the like for costly corrosion-resistant alloy material in parts which must be subjected to oxidizing of corrosion-causing atmospheres at elevated temperatures extending from approximately 1700° F. and above and which develops improved resistance to oxidation and corrosion in comparison thereto.

Another object of this invention is to provide improved high-temperature ceramic protective coatings for base materials to develop increased resistance to torsion and bending loadings in the applied coating.

Other objects and advantages of this invention will become apparent during consideration of the following detailed description.

APPLICATION

The invention described herein has particular utility with respect to products which are fabricated of: steel, including cast steels, low carbon steels (Type SAE 1010 and SAE 1020, for example), and tool steels (Types SAE 4130 and H-11, for example), enameling iron, copper, and exotic materials such as molybdenum, niobium (columbium), and tungsten. Likewise, this invention has application to compressed graphite or graphite-like components which have been previously provided with an exterior or surface ferrous plate. In general, my invention has application to metal-like surfaces which readily oxidize at temperatures ranging from red heat values upward. The invention is also thought to be useful with respect to surfaces of the metal tantalum.

With respect to specific applications, this invention has been utilized in the fabrication of brazing retorts fabricated of non-premium low-carbon cold-rolled steel (SAE 1010). Such retorts are utilized in the aircraft industry, for example, in connection with the brazing of stainless or precipitation-hardening steel honeycomb panels in controlled atmospheres at temperatures ranging up to 2000°

F. Such retorts are frequently rapidly cycled from the stated 2000° F. temperature to as low as approximately −100° F.

This invention has also been found particularly useful with respect to jigs, fixtures, and other tools which are used in connection with the forming and heat treating of component parts at high temperatures. In the absence of a satisfactory protective coating, such tools exhibit a comparatively short useful life.

The invention described herein has also successfully been utilized in connection with stove grates fabricated of non-premium, ferrous metals. In addition, heat sinks of copper metal have been successfully fabricated utilizing my invention. The coating also serves as a high-temperature electrical insulating coating as when applied to a copper base. Other applications for my invention involve use of the herein-described and claimed process in connection with the manufacture of diesel engine manifolds and steam boiler parts manufactured of low-carbon steel. Excellent protection against oxidation and chemical corrosion has been obtained for steel pipe hanger devices and for the steel tanks, pipes, and the like which carry water and/or steam at elevated temperatures.

As used in this application the terms "oxidation-susceptible surfaces," "corrosion-susceptible surfaces," and the like have reference to surfaces which are comprised of the metals identified in the first full paragraph under this heading Application. Such surfaces readily oxidize at temperatures of approximately 1500° F. to 1600° F. and upwards when exposed thereto to environments or atmospheres which contain air (oxygen) and corrosion-causing chemicals such as water (steam), engine exhaust gases, and the like.

PRE-TREATMENT

It is recommended that the metal surfaces of the component parts to be processed in accordance with this invention be pre-treated by suitable cleaning and abrading. Surfaces having oils or lubricants present thereon are preferably cleaned utilizing conventional solvent materials, or vapor degreasing techniques, or emulsion cleaning agents. If only very light oils or fingerprints are present on the metal surface, cleaning may be accomplished using known commercial alkaline cleaners. Afterwards the part should be rinsed and dried.

It is also recommended that the cleaned metal surface then be abraded using conventional abrasives. Sand blasting may be accomplished by delivering No. 40 mesh sharp sand by air blast at approximately 90 to 120 pounds per square inch air pressure uniformly over the surface of the to-be-processed part. As an alternate, fused alumina grit ranging from No. 60 mesh to No. 320 mesh may be substituted for sand. It is preferred that the air blast delivery pressure be kept to a minimum to avoid warpage when abrading thin, light-weight, or sheet-like base materials.

PROCESS STEPS

The properly pre-treated metal surface of the base part is next subjected to the several process steps of this invention. In general, such steps relate to: (1) providing an overlay comprised essentially of nickel and chromium in adhering relation to the pre-treated metal surface, and (2) applying and fusing a high-temperature ceramic protective coating over and to the nickel-chromium overlay. For optimum results I prefer that the nickel-chromium overlay be developed by sequentially applying first a nickel strike and then a chromium strike to the base part and subsequently applying and fusing the high-temperature ceramic protective coating over and to the chromium strike. However, excellent results are obtained when the nickel-chromium overlay is developed by flame-spraying a nickel-chromium alloy of powdered form upon the oxidizable or corrosion-susceptible surface of the base part. Other techniques for applying the nickel-chromium overlay required by my invention are described in this specification.

I. *Nickel-chromium overlay*

The step of providing a nickel-chromium overlay in adhering relation to an oxidation-susceptible or corrosion-susceptible metallic surface prior to coating with a high-temperature ceramic is novel and is original with this invention. Such step may be accomplished using any one of several conventional application techniques; in some cases the application may involve several sub-process steps. In general, the techniques for developing the nickel-chromium overlay on the surface of the to-be-processed part involves: (1) sequentially electro-depositing separate nickel and chromium strikes in a prescribed sequence, or (2) simultaneously depositing the nickel and chromium constituents in a suitable alloy material upon the oxidation-susceptible surface in adhering relation as by a flame-spraying technique, or (3) applying one or both of the overlay basic constituents to the part exterior oxidizable surface using a combination of separate electro-deposition, flame-spraying, diffusion, or vacuum deposition process steps in prescribed sequence. As previously suggested, optimum results and advantages are obtained in my invention through use of electro-deposition techniques as applied to separate nickel and chromium strikes or films. However, excellent results in comparison to known metal part protection methods are obtained when a flame-spray technique of metal application is employed to develop the required nickel-chromium overlay. Development work carried on to date also establishes that diffusion techniques, such as have been developed for depositing chormium on steel parts, can be advantageously employed in connection with this invention. It should be recognized that the overlay nickel constituent can be applied best alone by either electro-deposition or by flame-spraying a nickel powder on the pre-treated part. Conventional nickel application techniques also involve the application of a nickel oxide or a nickel compound to the base part followed by suitable reduction or disassociation steps. Experience seems to establish that nickel cannot be provided in the necessary overlay through use of a "gaseous" or "vapor" diffusion process. Also, the results obtained with vacuum deposition of chromium are not always the best obtainable. In any event, when the nickel and chromium constituents of the required nickel-chromium overlay are applied to the oxidation-susceptible surface of the to-be-protected part separately, it is important that the nickel be applied prior to application of the chromium.

The following discussion first provides detail information with respect to the preferred steps of sequential application of nickel and chromium and is followed by a discussion of details relating to diffusion deposition and flame-spraying techniques.

A. *Nickel strike.*—In order to obtain the optimum advantages of this invention it is preferred to first provide the above-described pre-treated metal surface with a nickel strike. Such nickel strike comprises an electro-deposited metallic nickel film ranging in thickness from approximately 0.0001″ to 0.0002″. A nickel plate, on the other hand, typically varies from 0.001″ to 0.004″ in thickness. Such added thickness is not required in connection with the practice of this invention, and in some instances may prove to be a disadvantage with respect to properties developed in the end product. The prescribed nickel strike may be obtained by practice of the details set forth below.

The part, if made of steel or a ferrous alloy, is first reverse-etched in a sulfuric acid-water solution containing 25% ±2% by weight of sulfuric acid to further assure the removal of oxides from exposed surface areas. The reverse-etch bath is maintained at approximately 80° F. and a minimum current of 200 amperes per square foot is conducted through the part for a period of approximately 5 minutes. In connection with this reverse-etching step the steel part should be made an anode. Afterwards the etched surface is rinsed with cold water.

The nickel strike is next obtained using either a nickel sulfate solution or nickel sulfamate solution. In the case of the nickel sulfate solution each gallon of solution water contains 22 to 26 ounces of nickel sulfate, 3 to 4 ounces of ammonium chloride, and 3.3 to 4.5 ounces of boric acid. A preferred nickel sulfamate solution plating bath contains, in each gallon of solution water, 60 ounces of nickel sulfamate, 4 ounces of boric acid, 0.5 ounce of stress reducer, and 10.2 ounces of metallic nickel. In connection with either nickel plating solution, the pre-treated metallic surface is suspended in the bath as a cathode. To achieve a satisfactory nickel strike using the above-described nickel sulfate solution, a current density of 30 to 70 amperes per square foot is maintained for a corresponding period of time ranging from approximately 6 minutes to approximately 3 minutes. In the case of the nickel sulfamate plating solution, plating current density is maintained at from approximately 40 to 80 amperes per square foot for a comparable period of time. In either case, the final thickness of the nickel strike should range from 0.0001″ to 0.0002″. Afterwards the part should be rinsed with tap water.

B. *Chromium strike.*—Next, the pre-treated metal surface having a nickel strike is provided with a superimposed chromium strike. Such chromium strike comprises an electro-deposited metallic chromium film ranging in thickness from approximately 0.0001″ to 0.0002″. A chromium plate, on the other hand, typically varies from 0.001″ to 0.004″ in thickness. Such added thickness is not required in connection with the practice of this invention, and in some instances may prove to be a disadvantage with respect to properties developed in the end product. The prescribed chromium strike may be obtained by practice of the details set forth below.

The nickel-striked metal surface is immersed as a cathode in a plating bath which contains 30 to 34 ounces of chromic acid and .30 to .34 ounces of sulfuric acid for each gallon of solution water. The following current densities may be established for the indicated periods of time to provide a suitable chromium overstrike: 3.0 amperes per square inch maintained for approximately 6 minutes, 4.0 amperes per square inch maintained for approximately 4½ minutes, or 5.0 amperes per square inch maintained for approximately 3 minutes. The bath temperature should be maintained at approximately 135° F.±5° F. Afterwards the part is suitably rinsed and preferably force-dried. It is important that the chromium strike completely cover the previously-applied nickel strike.

C. *Diffusion deposition.*—Numerous techniques exist for diffusing chromium and other metals into base parts. In general, the depth of diffusion may range from 1 to 5 mils and will depend upon the length of time the to-be-processed part is exposed to the "gaseous metal" at a particular elevated temperature.

In the practice of this invention the following technique has been employed to deposit chromium upon a previously-applied nickel strike or nickel film. The pre-treated part, having a nickel strike or surface film thereon, is placed in a sealed retort with a sufficient quantity of chromium halide compound. The loaded retort is placed in a furnace and heated to a temperature of from 1650° F. to 2000° F. At the prescribed elevated temperature, the chromium-containing compound is decomposed and chromium metal vapors are released within the retort. The parts and loaded retort are maintained at the elevated temperature for from 8 to 16 hours to permit the diffusion of chromium into the nickel-coated, oxidation-susceptible surface of the metal part. Afterwards, the retort and parts are cooled and the parts removed for subsequent application of the required high-temperature ceramic protective coating as described below.

D. *Flame-spraying deposition.*—If a flame-spraying technique for developing the required nickel-chromium overlay on the pre-treated metal part is prefered in whole or in part to an electro-deposition technique for reasons of ease of application, the following should be considered.

An alloy metal in powdered (or wire) form and comprised essentially of nickel and chromium is preferred for use in connection with a flame-spraying technique, one satisfactory material which has been employed for this purpose is a powdered alloy containing approximately 80% nickel and approximately 20% chromium. Other nickel-chromium alloys containing approximately equal parts of nickel and chromium, and nickel-chromium-iron alloys have generally also proved acceptable for use with this invention. Such materials are typically fed into a conventional flame-spraying gun having a feed hopper and operating with a combination of oxygen and acetylene gases. The metal powder (or wire) passes through the equipment gun flame having a temperature of from 3000° F. to 4000° F., is melted, and is projected by a carrier gas onto the surface of the pre-treated and to-be-processed part. Such operation effects a mechanical bond upon cooling of the melted material and best results are obtained if the carrier gas is selected so as to provide a slightly reducing atmosphere at the surface of the part. In this manner undesirable oxidation or corrosion of the surface may be substantially avoided.

Sufficient alloy material is applied to the part to develop an essentially nickel-chromium overlay having a thickness of approximately 2 to 3 mils. During the subsequent process step of firing a high-temperature ceramic protective coating to the overlay, the ceramic coating operates to seal off the oxidizable or corrosion-susceptible surface and the nickel-chromium overlay from exposure to oxygen and the like in the firing furnace atmosphere. At the elevated ceramic material firing temperature the nickel-chromium overlay forms a solid solution with the base metal and forms a tightly adherent "skin" under the high-temperature ceramic protective coating. The subsequently provided high-temperature ceramic coating fuses well with the "skin"; also, improved adhesion of the ceramic to the "skin" is developed through the dissolving of any oxides formed during coating firing in the glass phase of the hereinafter-described ceramic coating compositions.

II. *Coating application*

Next, a suitable high-temperature ceramic protective coating is applied to the metal surface over the nickel-chromium overlay. Detailed information with respect to the composition of ceramic protective coatings which have proven satisfactory for use in connection with this invention will be provided hereinafter. In general, such materials are particularly selected for specific applications. Material characteristics with respect to application techniques, firing temperature, flow properties, refractory qualities, expansion-contraction characteristics, adhesion, and high-temperature thermal endurance are developed using formulation techniques which, at least in part, are known to those skilled in the art.

The ceramic protective coating is comprised of both glass frit and refractory constituents; application may be by either spraying, dipping, or sloshing a slurry mixture (slip) followed by suitable drying. In general, such ceramic protective materials are provided over the chromium strike to a depth which will result in a final fired coating thickness of 0.001″ to 0.002″.

The applied coating, in the case of glass frit-refractory slip mixtures, is afterwards fused to the nickel-chromium strike combination or overlay by furnace firing in an oxygen-containing (air) atmosphere at temperature of from approximately 1700° F. to 2200° F. The firing schedule actually selected depends upon the composition of the coating material. Conventional furnace equipment and firing practices are employed to carry out the coating firing operation.

CERAMIC PROTECTIVE COATING MATERIALS

A glass frit-refractory type of protective coating which is preferred in the practice of this invention may be developed through use of a slip having, by weight:

| | Parts |
|---|---|
| Glass frit | 100 |
| Refractory | 2–100 |
| Suspension agent | ½–10 |
| Water | 40–70 |

Such slip is preferably applied to the metallic base or metallic surface which is to be protected against corrosion and high temperatures by either brushing, spraying, dipping, or sloshing. The lower limit for parts by weight of refractory contained in the protective coating and contained in the slip is established with due consideration to the amount of refractory material, if any, contained in the glass frit. Detailed information will be provided hereinafter with respect to the glass frit, refractory, and suspension agent portions of the above-indicated protective coating slip. Such information will establish a better understanding, as to the high-temperature glass frit-refractory type of ceramic coatings which I preferably employ in the practice of this invention.

I. Glass frit

Glass frits for the practice of this invention include, in combination, glass and a refractory additive and may be grouped into two categories. One category consists of glass frits which are essentially based upon the presence of a devitrite-type glass. Such frits are detailed by the Example "A" and Example "B" glass frit compositions provided below. The other category of glass frits have been compounded to provide particular or controlled thermal expansion characteristics and are selected and combined in proper proportions to comprise an improved coating slip as hereinafter-described. Details regarding such glass frits are provided in the Example "G," Example "H," and Example "J" glass frit compositions provided in this description. In general, a prepared (calcined) refractory oxide composition or a mixture of refractory oxides are added to glass-forming constituents at the time the glass frit batch ingredients are mixed for smelting.

A suitable devitrite glass for use in the glass frit employed in this invenntion is based on a sodium-calcium-silicate glass system such as that referenced in the publication, Phase Diagrams for Ceramists, by Levin, McMurdie, and Hall, 1956, American Society, Inc., Columbus, Ohio, at page 168, Figure 460. Preference is generally given to a glass system falling within the lower portion of the "devitrite" area delineated in such reference. In general, glass systems containing the devitrite composition $Na_2O.3CaO.6SiO_2$ exhibit improved resistance to devitrification at high temperatures over extended periods of time. Additions of boric oxide to the devitrite glass system composition increase the effective devitrification area and permit the subsequent incorporation of other refractory oxides into the basic glass to obtain improved properties relating to thermal endurance, flow, refractoriness, thermal expansion-contraction "fit" to the base metal, adhesion, color, and/or surface emissivity.

A representative cross-section of refractory additives which may be combined with the basic glass to establish a suitable frit includes the oxides of: nickel, chromium, aluminum, silicon, titanium, zirconium, iron, manganese, molybdenum, cobalt, cerium, niobium, vanadium, beryllium, and tin. Any such oxide, alone or calcined or otherwise combined with other such oxides, are added to the basic glass to effect the desired resultant physical properties for the glass frit. The percent weight of added refractory depends upon the degree of solubility of the particular oxide in the basic glass system. For example, the oxides of titanium, iron, manganese, and niobium are comparatively soluble in the glass during smelting and function to add thermal endurance qualities to the protective coating without developing excessive refractoriness. The oxides of cerium and cobalt are moderately soluble in the basic glass and cannot be added in large quantities without effecting a loss of flow. The oxides of nickel, chromium, aluminum, zirconium, and beryllium are least soluble in the glass and small quantity additions thereof operate to develop refractoriness, heat resistance, and reduced flow characteristics in the resulting glass frit.

The ingredients which comprise the glass frit are weighed in a batch composition, thoroughly mixed, smelted, and then quenched. Two preferred devitrite glass frits are detailed as to compositions in the following examples:

EXAMPLE "A"—GLASS FRIT COMPOSITION
[Parts by weight]

| Ingredient | Range | Preferred Amount |
|---|---|---|
| $SiO_2$ | 70.0–75.0 | 73.5 |
| $Na_2O$ | 13.5–21.3 | 21.3 |
| $CaO$ | 5.2–13.0 | 5.2 |
| $B_2O_3$ | 1.0–5.0 | 5.0 |
| Refractory Oxide (Example "C") | 1.0–3.0 | 2.5 |
| $TiO_2$ | 0.0–10.0 | 7.5 |

EXAMPLE "B"—GLASS FRIT COMPOSITION
[Parts by weight]

| Ingredient | Range | Preferred Amount |
|---|---|---|
| $SiO_2$ | 30.0–55.0 | 48.8 |
| $CaO$ | 14.0–26.0 | 22.8 |
| $B_2O_3$ | 7.0–35.0 | 13.8 |
| $Na_2O$ | 13.0–21.0 | 14.6 |

The preferred devitrite glass frit compositions set forth in connection with Example "A" may be developed by smelting the following glass frit batching ingredients in the indicated amounts by weight at 2550° F. until "fined" and afterwards quenching the molten composition:

| | Parts |
|---|---|
| Silica | 51.7 |
| Anhydrous soda ash | 14.6 |
| Sodium nitrate | 13.7 |
| Fluorspar | 3.0 |
| Dehydrated borax | 5.0 |
| Calcium carbonate | 2.8 |
| Titanium dioxide | 5.3 |
| Example "C" refractory oxide | 1.8 |

If it is desired to reduce the surface tension characteristic of the resulting glass frit in its molten state, manganese oxide in the amount of 0.5 to 2.5 parts by weight should be included in the glass frit composition. 2.5 parts by weight of manganese oxide are obtained in the frit composition by adding 2.1 parts by weight of manganese dioxide to the frit batching ingredients identified in this particular paragraph.

The preferred devitrite glass frit composition set forth in connection with Example "B" may be developed by compounding the following glass frit batching ingredients in the indicated amounts by weight:

| | Parts |
|---|---|
| Silica | 39.3 |
| Calcium carbonate | 32.8 |
| Anhydrous soda ash | 11.7 |
| Fused borax | 16.2 |

To prepare the frit ingredients for addition to a slip mixture, the glass and refractory oxide components are dry-mixed, smelted at 2500° F. until fined, and subsequently quenched and ground.

An improved high-temperature ceramic protective coating which is especially suitable for the protection of the surfaces of steel parts may be developed using a combination of particularly selected glass frit having predetermined thermal expansion characteristics. Details regarding separate high, medium, and low thermal expansion glass frits are provided in the following Examples "G," "H," and "J," respectively. As in the case of the Example "B" glass frit, the refractory oxide constituents which are added to the frit batching ingredients occur as a mixture of oxides rather than as a prepared and separately calcined refractory composition.

The ingredients which are used to comprise the preferred high, medium, and low thermal expansion glass frits are weighed in a batch composition, thoroughly mixed, smelted, and then quenched. Such glass frits are detailed as to composition in the following examples:

EXAMPLE "G"—GLASS FRIT COMPOSITION

[Parts by weight]

| Ingredient | Range | Preferred Amount |
|---|---|---|
| $SiO_2$ | 42.0–54.0 | 48.0 |
| $B_2O_3$ | 2.0–6.0 | 4.0 |
| $Al_2O_3$ | 0.5–2.0 | 1.0 |
| $ZnO$ | 6.0–12.0 | 9.0 |
| $K_2O$ | 6.0–8.0 | 7.0 |
| $Na_2O$ | 0.5–2.0 | 1.0 |
| $BaO$ | 21.0–39.0 | 30.0 |

EXAMPLE "H"—GLASS FRIT COMPOSITION

[Parts by Weight]

| Ingredient | Range | Preferred Amount |
|---|---|---|
| $SiO_2$ | 38.0–43.0 | 40.0 |
| $B_2O_3$ | 4.0–8.0 | 6.0 |
| $Al_2O_3$ | 2.0–4.0 | 3.0 |
| $ZnO$ | 6.0–12.0 | 9.0 |
| $BaO$ | 4.0–50.0 | 42.0 |

EXAMPLE "J"—GLASS FRIT COMPOSITION

[Parts by Weight]

| Ingredient | Range | Preferred Amount |
|---|---|---|
| $SiO_2$ | 77.0–84.0 | 81.0 |
| $B_2O_3$ | 9.0–17.0 | 13.0 |
| $K_2O+Na_2O$ | 2.0–5.0 | 3.8 |
| $Al_2O_3$ | 1.0–3.0 | 2.2 |

The preferred high thermal expansion glass frit composition set forth in connection with Example "G" may be developed by smelting the following glass frit batching ingredients in the indicated amounts by weight at 2500° F. to 2650° F. until free of bubbles and afterwards quenching the molten composition:

| | Parts |
|---|---|
| Silica | 426.0 |
| Barium carbonate | 341.0 |
| Potassium | 91.5 |
| Zinc oxide | 80.0 |
| Boric oxide | 35.5 |
| Soda ash (anhydrous) | 15.0 |
| Aluminum hydrate | 11.0 |

The preferred medium thermal expansion glass frit composition set forth in connection with Example "H" may be developed by smelting the following glass frit batching ingredients in the indicated amounts by weight at 2500° F. to 2650° F. until free of bubbles and afterwards quenching the molten composition:

| | Parts |
|---|---|
| Barium carbonate | 480.0 |
| Silica | 356.0 |
| Zinc oxide | 80.0 |
| Boric oxide | 53.0 |
| Aluminum hydrate | 31.0 |

The preferred low thermal expansion glass frit composition set forth in connection with Example "J" may be developed by smelting the following glass frit batching ingredients in the indicated amounts by weight at 2500° F. to 2650° F. until free of bubbles and afterwards quenching the molten composition:

| | Parts |
|---|---|
| Silica | 752.0 |
| Nepheline-syenite | 93.0 |
| Anhydrous borax | 80.0 |
| Boric oxide | 75.0 |

II. *Refractory*

The refractory material selected and used as a mill addition to the ceramic protective coating slip is generally comprised of one or more of the refractory oxides identified above in connection with the description of the glass frit refractory additive. The refractory material is mill-added to the slip to produce the desired firing temperature, maturing temperature, and coefficient of thermal expansion-contraction to "fit" the base metal or metal surface of the processed product. The amount of refractory included in the slip composition depends upon the refractoriness of the glass frit used in the slip. For instance, a comparatively high percentage of refractory oxide melted into the basic glass increases the frit melting temperature, reduces its flow characteristics at the maturing temperature desired, and would be used with relatively less additional refractory, if any, in the slip mill charge. On the other hand, a glass frit having a low percentage of refractory additive melted into the basic glass would have a comparatively low melting temperature and would have an increased flow characteristic at the desired maturing temperature. A comparatively larger percentage of refractory material would be combined with such a glass frit to comprise the slip composition.

Generally, I prefer that the ceramic protective coating contains a proper total quantity of refractory whereby sufficient flow is developed during firing to completely eliminate coating porosity within the first two or three minutes of the firing operation.

One particular refractory composition which may be employed in the practice of my invention has the ingredients set forth in the following example:

EXAMPLE "C"—REFRACTORY

[Parts by weight]

| Ingredients: | Preferred amount |
|---|---|
| $NiO$ | 33.0 |
| $Cr_2O_3$ | 32.5 |
| $Co_3O_4$ | 8.4 |
| $MoO_3$ | 10.3 |
| $Fe_2O_3$ | 7.85 |
| $AlO(OH)$ | 5.1 |
| $TiO_2$ | 3.0 |
| $MnO_2$ | 0.88 |
| $SiO_2$ | 0.77 |

The recited constituents of the Example "C" refractory are preferably ball-milled with an equal quantity by weight of distilled water until intimately mixed. The milled ingredients are then dried and afterwards calcined to 2600° F. for 2 hours. The calcined product is then powdered to −200 mesh size. If the Example "C" refractory is added to a basic glass to comprise the glass frit, it is preferred that the material be added to the frit batch during smelting. If necessary, the indicated refractory oxides can be added to the particular base composition in an uncalcined or raw condition. Generally, this practice is not preferred.

Another refractory composition which may be successfully employed as the refractory portion of the glass frit-refractory slip mixture includes the ingredients set forth as follows:

EXAMPLE "D"—REFRACTORY

[Parts by weight]

Ingredients: Preferred amount
- NiO _____ 33.0
- $Cr_2O_3$ _____ 32.5
- $Co_3O_4$ _____ 8.4
- $MoO_3$ _____ 10.3
- $Fe_2O_3$ _____ 7.85
- AlO(OH) _____ 5.1
- $TiO_2$ _____ 3.0
- $MnO_2$ _____ 0.88
- $SiO_2$ _____ 0.77
- $BaSiO_3$ _____ 13.0

The above-recited constituents differ from the composition of the Example "C" refractory in the addition of the barium silicate additive. In general, the barium silicate material is ground to −200 mesh and thoroughly mixed with the Example "C" formulation before calcination.

The above-detailed example refractories are each mixed and calcined prior to addition to either a ceramic coating slip or to a glass frit batching mixture. However, the following refractory is essentially only a mixture of refractory oxides and may be employed advantageously in the ceramic coating slip formulation which is hereinafter-described in connection with Example "L." For identification purposes, this particular refractory oxide mixture is designated Example "K" and has the following composition:

EXAMPLE "K"—REFRACTORY

[Parts by weight]

Ingredients: Preferred amount
- NiO _____ 16.7
- $Cr_2O_3$ _____ 16.7
- $SiO_2$ _____ 66.6

III. Suspension agent

The above-identified glass slip typically includes a suspension agent to maintain proper dispersion of the glass frit and refractory in either a water or oil vehicle. It is preferred that either enameler's clay or bentonite be used as a suspension agent in connection with this invention. Normally, a relatively lesser quantity of bentonite is required if such is used in place of enameler's clay. A good grade of purified bentonite, as commonly used with porcelain enamel materials is recommended. If enameler's clay is employed, a water-washed, air-floated enameler's grade of clay having moderate to high "set" is preferred.

APPLICATION EXAMPLES

The following information relates to use of the invention in connection with the fabrication of panels for a brazing retort. Sheet-like low-carbon steel panels were formed to size and provided with the vapor degreasing and abrasive cleaning treatments previously described herein. The pre-cleaned panels were next provided with a nickel strike to a depth of 0.00015″ and with a subsequent chromium strike to a like depth. The sequential nickel and chromium overlays were developed by using the strike methods described under the heading Process Steps.

Subsequent thereto, the processed panels were coated with a ceramic-type material having a slip with the following preferred composition:

EXAMPLE "E"—SLIP

[Parts by weight]

| Ingredients | Range | Preferred Amount |
| --- | --- | --- |
| Example "A" Glass Frit | 70–100 | 100 |
| Enameler's Clay | 5–10 | 7 |
| Bentonite | 0–1 | 0 |
| Example "D" Refractory | 2–30 | 15 |
| Sodium Nitrite | ⅛–¼ | ¼ |
| Water | 40–70 | 55 |

The above-listed slip batching ingredients were milled to a trace on a 325 mesh screen (relative to a 100 gram sample). The milled slip was afterwards applied to the pre-treated low-carbon steel panels over the combined nickel and chromium strikes to a sufficient depth whereby the resulting coating, after firing to maturity at 1800° F. to 1900° F., developed a thickness of from .001″ to .002″. After complete manufacture, the ceramic coated retort panels processed in accordance with this invention were thermally cycled in a comparatively rapid manner over the range of 1750° F. to −70° F. in an air atmosphere for 19 complete cycles. At the end of such cycling no failure or deterioration of the resulting non-porous coating could be observed and there was no oxidation or corrosion of the metar contained in the retort panels.

The invention described in this application has also been used in connection with copper bar stock. A copper bar workpiece was first provided with the pre-treatment cleaning and abrading operations described herein. Afterwards the bar was provided with a nickel strike to a depth of 0.00015″ using the method described herein; immediately thereafter a chromium strike was superimposed upon the nickel strike to a like depth using the method set forth under the heading Process Steps.

The so-processed copper bar was then coated with a ceramic protective coating slip having the following mill composition:

EXAMPLE "F"—PROTECTIVE COATING SLIP

[Parts by weight]

| Ingredients | Range | Preferred Amount |
| --- | --- | --- |
| Example "B" Glass Frit | 50–100 | 100 |
| Enameler's Clay | 5–10 | 7 |
| Example "D" Refractory | 5–50 | 12½ |
| Sodium Nitrite | ¼ | ¼ |
| Water | 40–70 | 60 |

The slip ingredients listed above were milled in the manner of the slip ingredients identified in connection with Example "E." Application of the slip to the copper part corresponded to the application technique described in connection with the low-carbon steel brazing retort panels except that the slip materials were fired to maturity at a temperature of from 1800° F. to 1850° F.

The so-coated copper bar was subjected to 4 repeated cycles wherein the part was heated to a temperature of 1850° F. for one-half hour and afterwards quenched in tap water at room temperature. The improved non-porous protective coating exhibited no failure with respect to either porosity or adhesion. In addition, the copper part exhibited no corrosion or oxidation due to the air atmosphere in which it was heated.

The invention described herein has also been employed in connection with the coating of common steel boiler plate stock having thicknesses of approximately ⅛″ and ¼″. The to-be-protected boiler plate parts were later used as a heat barrier in a rocket launching pad. The high-temperature ceramic protective coating described below attained excellent protection of the base metal against oxidation and corrosion at elevated temperatures.

The boiler plate parts were first provided with the pre-treatment cleaning and abrading operations described herein. Afterwards, the parts were provided with a nickel-chromium overlay to a depth of approximately 0.0003" using the sequential electro-deposition methods previously described in detail under the heading Process Steps. Next, the boiler plate parts were coated with a ceramic protective coating slip having the following mill composition:

EXAMPLE "L"—PROTECTIVE COATING SLIP

[Parts by weight]

| Ingredients | Range | Preferred Amount |
|---|---|---|
| Example "G" Glass Frit | 35.0–40.0 | 37.5 |
| Example "H" Glass Frit | 10.0–15.0 | 12.5 |
| Example "J" Glass Frit | 35.0–40.0 | 37.5 |
| Example "K" Refractory | 12.0–18.0 | 15.0 |
| Annealed Nickel Powder (−325 Mesh) | 7.0–8.0 | 7.5 |
| Enameler's Clay | 4.0–7.0 | 5.0 |
| Distilled Water | 50.0–60.0 | 60.0 |

The slip ingredients listed above were milled in the manner of the slip ingredients identified in connection with Examples "E" and "F." Application of the coating slip to the boiler plate parts was by a spraying technique and included the covering of previously-provided weld joints. The applied slip, after suitable drying, was fired to maturity at a temperature of 1800° F. to 1850° F.

The coated parts were subjected to ten repeated cycles wherein each part was heated to a temperature of 1700° F. to 1750° F. and immediately quenched in tap water at room temperature. In addition, the parts were continuously maintained in an air atmosphere at a temperature of at least 1700° F. for over 500 hours. There was no detectable failure of the high-temperature ceramic protective coating and no corrosion or oxidation of the base metal protected thereby.

The high-temperature ceramic protective coating described in connection with the composition of Example "L" appears to offer advantages over the previously-detailed ceramic coating slips having devitrite-type glass in that added resistance to chemical attack or corrosion at elevated temperatures is developed. Also, the high-temperature ceramic protective coating of Example "L" appears to have a greater versatility for effecting thermal expansion fits to base metals having a relatively wide range of thermal expansion characteristics in comparison to the limited expansion range capability afforded by the devitrite-type glass materials. However, both coating formulations provided a protective coating which did not fail after repeated extreme thermal shock and prolonged exposure to high-temperature environment conditions.

Further, the invention described herein has been utilized in connection with workpieces fabricated of molybdenum. Molybdenum panels formed of 0.020" sheet stock were first cleaned and abraded using the techniques heretofore-described. Afterwards, such panels were provided with a nickel film having a thickness of from 0.0001" to 0.0002" using the nickel electro-depositing steps separately described above. The nickel coated panels were then provided with an electro-deposited chromium film having a thickness of from 0.0001" to 0.0002" using the chromium strike treatment described under the heading Process Steps. The molybdenum panels having the nickel-chromium combination overlay were next coated with a ceramic protective coating slip having a mill composition which corresponded to the preferred composition set forth in connection with Example "E" except that 25 parts by weight of Example "D" refractory were used instead of 15 parts thereof. The slip material was applied to the molybdenum panels and fired to maturity at an approximate temperature of 2000° F. The ceramic-coated panels were afterwards repeatedly cycled between the temperature extremes of 1950° F. and −70° F. in an air atmosphere. After performing numerous thermal cycles the molybdenum workpieces were examined for coating failure and/or metal oxidation but no such deficiency existed in connection with the coated part.

The invention described herein has also been employed in connection with alloy materials (e.g., ultra-high-strength steels) which receive a heat treatment at elevated temperatures to develop improved strength therein. Such workpieces are typically heat treated in an air atmosphere and are often subjected to metal decarburization and the like. My invention has proved effective to protect the alloy material during heat treatment and in some instances need not be removed from the workpiece subsequent to the heat treatment operation. Coating removal is not necessary because of the superior bending and torsion resistance that is developed in the ceramic material.

I claim:

In a coated workpiece, in combination:
(a) A surface which constitutes a base interface of oxidizable metal selected from the group consisting of iron, alloys of iron, copper, molybdenum, niobium, and tungsten,
(b) A complex metal consisting of nickel, chromium, and said oxidizable metal adhered to the workpiece at said base interface, and
(c) A non-porous high-temperature ceramic coating consisting of glass frit, refractory oxide, and oxides formed and in solution with said complex metal adhered to said complex metal to comprise the exterior surface of the coated workpiece, said glass frit and said refractory oxide being combined in the ratio of approximately 100 parts by weight of glass frit to from 2 to 100 parts by weight of refractory oxide, said glass frit being from the group consisting of devitrite-type glass frits and of substantially fluorine-free glass frits having calculated alkali metal oxide contents of less than approximately 10% on a weight basis and smelting temperatures in the range of approximately 2500° F. to 2650° F., and said refractory oxide being from the group consisting of the oxides of aluminum, beryllium, cerium, cobalt, chromium, iron, manganese, molybdenum, nickel, niobium, silicon, tin, titanium, and zirconium.

References Cited by the Examiner

UNITED STATES PATENTS

| 2,696,662 | 12/54 | Le Sech. | |
| 2,716,271 | 8/55 | Higgins | 117—70 |
| 2,781,636 | 2/57 | Brandes | 117—70 |
| 3,006,782 | 10/61 | Weildon. | |
| 3,069,760 | 12/62 | Schultz. | |
| 3,086,284 | 4/63 | Schetky | 29—195 |

HYLAND BIZOT, Primary Examiner.

JOHN C. MARTIN, Jr., DAVID L. RECK, Examiners.